US012714628B2

(12) United States Patent
Haik et al.

(10) Patent No.: US 12,714,628 B2
(45) Date of Patent: Aug. 25, 2026

(54) WALKER DEVICE FOR GAIT TRAINING

(71) Applicants: Katherine Haik, Stillwater, MN (US); Charles A. Haik, Stillwater, MN (US)

(72) Inventors: Katherine Haik, Stillwater, MN (US); Charles A. Haik, Stillwater, MN (US)

( * ) Notice: Subject to any disclaimer, the term of this patent is extended or adjusted under 35 U.S.C. 154(b) by 0 days.

(21) Appl. No.: 18/653,595

(22) Filed: May 2, 2024

(65) Prior Publication Data

US 2025/0032342 A1 Jan. 30, 2025

Related U.S. Application Data

(60) Continuation of application No. 17/242,700, filed on Apr. 28, 2021, now Pat. No. 11,986,435, which is a continuation of application No. 15/966,248, filed on Apr. 30, 2018, now Pat. No. 11,000,440, which is a continuation of application No. 15/074,231, filed on Mar. 18, 2016, now Pat. No. 9,956,131, which is a division of application No. 13/557,943, filed on Jul.

(Continued)

(51) Int. Cl.

| | |
|---|---|
| ***A61H 3/04*** | (2006.01) |
| ***A63B 21/00*** | (2006.01) |
| ***A63B 21/045*** | (2006.01) |
| ***A63B 23/04*** | (2006.01) |

(52) U.S. Cl.

CPC ........... *A61H 3/04* (2013.01); *A63B 21/0004* (2013.01); *A63B 21/00069* (2013.01); *A63B 21/045* (2013.01); *A63B 23/0405* (2013.01); *A61H 2003/046* (2013.01); *A61H 2201/0161* (2013.01); *A61H 2201/0192* (2013.01)

(58) Field of Classification Search

CPC ........................................................ A61H 3/04
USPC ...................................................... 135/66, 67
See application file for complete search history.

(56) References Cited

U.S. PATENT DOCUMENTS 732,309 A 6/1903 Marshall
2,362,466 A * 11/1944 Carter ..................... A61H 3/04 482/67

(Continued)

OTHER PUBLICATIONS

"Final Office Action," for U.S. Appl. No. 13/557,943, mailed May 20, 2014 (7 pages).

(Continued)

*Primary Examiner* — Noah Chandler Hawk
(74) *Attorney, Agent, or Firm* — Pauly, DeVries Smith & Deffner LLC

(57) ABSTRACT

A walker device is described herein including two side frames, each side frame including a front vertical support, a rear vertical support and at least one connecting member extending between the front and rear vertical supports. The walker device further includes a cross bar extending between the two side frames and pivotally connecting to the front vertical supports of the two side frames. The walker device also includes a tension device which applies a resistive force to the pivoting motion between the first cross bar and the two side frames. The walker device is therefore capable of a pivoting configuration which enables the user to learn or re-learn a more natural gait pattern including rotation of the upper and lower body. Some embodiments of the walker device include a second, auxiliary cross bar that is parallel to the first cross bar and horizontally offset from the first cross bar.

20 Claims, 5 Drawing Sheets

Related U.S. Application Data

25, 2012, now abandoned, which is a continuation of application No. 12/948,320, filed on Nov. 17, 2010, now Pat. No. 8,251,079.

(60) Provisional application No. 61/281,465, filed on Nov. 18, 2009.

(56) References Cited

U.S. PATENT DOCUMENTS

| | | | | |
|---|---|---|---|---|
| 2,656,874 | A | 10/1953 | Robb | |
| 2,996,070 | A | 8/1961 | Ries | |
| 3,098,651 | A | 7/1963 | Murcott | |
| 3,442,276 | A | 5/1969 | Edwards et al. | |
| 3,658,079 | A | 4/1972 | Block | |
| 3,690,652 | A | 9/1972 | Schneider | |
| 3,783,886 | A | 1/1974 | Thomas | |
| 3,945,389 | A | 3/1976 | Smith | |
| 3,993,088 | A | 11/1976 | Thomas | |
| 4,298,016 | A | 11/1981 | Garelick | |
| 4,619,282 | A | 10/1986 | Battiston | |
| 4,640,301 | A | 2/1987 | Battiston et al. | |
| 4,993,446 | A | 2/1991 | Yarbrough | |
| 5,188,139 | A | 2/1993 | Garelick | |
| 5,275,187 | A | 1/1994 | Davis | |
| 5,347,666 | A | 9/1994 | Kippes | |
| 5,402,587 | A | 4/1995 | Buschbacher | |
| 5,411,044 | A | 5/1995 | Andolfi | |
| 5,433,235 | A | 7/1995 | Miric et al. | |
| 5,509,152 | A | 4/1996 | Kippes | |
| 5,511,571 | A | 4/1996 | Adrezin et al. | |
| 5,579,793 | A | 12/1996 | Gajewski et al. | |
| 5,692,762 | A | 12/1997 | Obitts | |
| 5,785,070 | A | 7/1998 | Block et al. | |
| 5,853,219 | A | 12/1998 | Santuccio | |
| 5,979,476 | A | 11/1999 | Cranny | |
| 6,145,524 | A | 11/2000 | Li et al. | |
| 6,338,354 | B1 | 1/2002 | Alexander | |
| 6,401,738 | B1 | 6/2002 | Alexander | |
| 6,453,921 | B1 | 9/2002 | Rost et al. | |
| 6,460,891 | B1 | 10/2002 | Jones | |
| D483,702 | S | 12/2003 | Gilles | |
| 6,886,575 | B2 | 5/2005 | Diamond | |
| 7,219,906 | B2 | 5/2007 | Richter et al. | |
| 7,294,094 | B1 | 11/2007 | Howle | |
| 7,422,025 | B1 | 9/2008 | Waldstreicher et al. | |
| 7,506,657 | B2 | 3/2009 | Hsiao | |
| 7,651,649 | B2 | 1/2010 | Reichlin et al. | |
| 7,703,465 | B2 | 4/2010 | Diamond | |
| 7,992,584 | B1 | 8/2011 | Birnbaum et al. | |
| 8,234,755 | B1 | 8/2012 | Santizo et al. | |
| 8,251,079 | B1 | 8/2012 | Katherine et al. | |
| 8,573,612 | B1 | 11/2013 | Fulk et al. | |
| 8,726,922 | B2 | 5/2014 | Pak et al. | |
| 8,944,458 | B1 | 2/2015 | Ferez et al. | |
| 9,022,397 | B1 | 5/2015 | Prettyman | |
| 9,149,408 | B2 | 10/2015 | Karlovich et al. | |
| 9,180,064 | B2 | 11/2015 | Prather | |
| 9,381,132 | B2 | 7/2016 | Chen | |
| 9,956,131 | B2 | 5/2018 | Haik et al. | |
| 11,000,440 | B2 | 5/2021 | Haik et al. | |
| 11,986,435 | B2 | 5/2024 | Haik et al. | |
| 2005/0156395 | A1 | 7/2005 | Bohn et al. | |
| 2006/0105884 | A1 | 5/2006 | Chinchillo | |
| 2009/0224499 | A1 | 9/2009 | Dashew et al. | |
| 2009/0242006 | A1 | 10/2009 | Warren et al. | |
| 2011/0272913 | A1 | 11/2011 | Diamond et al. | |
| 2013/0167888 | A1 | 7/2013 | Losasso et al. | |
| 2013/0334784 | A1* | 12/2013 | Pak | A61H 3/00<br>280/87.041 |
| 2016/0120731 | A1 | 5/2016 | VanAusdall | |
| 2016/0262970 | A1 | 9/2016 | Lutz et al. | |
| 2017/0007872 | A1 | 1/2017 | Ho et al. | |
| 2017/0008544 | A1 | 1/2017 | Kindberg | |
| 2017/0014298 | A1 | 1/2017 | O'Sullivan | |
| 2019/0099318 | A1 | 4/2019 | Haik et al. | |
| 2022/0079834 | A1 | 3/2022 | Haik et al. | |

OTHER PUBLICATIONS

"Final Office Action," for U.S. Appl. No. 13/557,943 mailed Sep. 23, 2015 (7 pages).
"Final Office Action," for U.S. Appl. No. 15/966,248 mailed Jul. 23, 2020 (8 pages).
"Final Office Action," for U.S. Appl. No. 17/242,700 mailed Jan. 27, 2023 (12 pages).
"Non-Final Office Action Received," mailed Jan. 26, 2012 in co-pending U.S. Appl. No. 12/948,320, "Walker Device for Gait Training" (12 pages)., 12.
"Non-Final Office Action," for U.S. Appl. No. 13/557,943, mailed Mar. 12, 2015 (8 pages).
"Non-Final Office Action," for U.S. Appl. No. 13/557,943, mailed Nov. 6, 2013 (7 pages).
"Non-Final Office Action," for U.S. Appl. No. 15/074,231 mailed Mar. 16, 2017 (17 pages).
"Non-Final Office Action," for U.S. Appl. No. 15/966,248 mailed Jan. 16, 2020 (7 pages).
"Non-Final Office Action," for U.S. Appl. No. 15/966,248 mailed Jul. 9, 2019 (15 pages).
"Non-Final Office Action," for U.S. Appl. No. 17/242,700 mailed Jul. 19, 2022 (16 pages).
"Non-Final Office Action," from U.S. Appl. No. 13/557,943, mailed Aug. 5, 2013, 7 pages.
"Notice of Allowance Received," Citation mailed Apr. 25, 2012in co-pending U.S. Appl. No. 12/948,320, "Walker Device for Gait Training" (8 pages)., 8.
"Notice of Allowance," for U.S. Appl. No. 15/074,231 mailed Dec. 14, 2017 (11 pages).
"Notice of Allowance," for U.S. Appl. No. 15/966,248 mailed Jan. 15, 2021 (5 pages).
"Notice of Allowance," for U.S. Appl. No. 17/242,700 mailed Jan. 18, 2024 (8 pages).
"Notice of Allowance," from U.S. Appl. No. 13/557,943, mailed Apr. 26, 2013, 10 pages.
"Response to Non Final Office Action," for U.S. Appl. No. 15/074,231, filed Sep. 15, 2017 (11 pages).
"Response to Non Final Office Action," for U.S. Appl. No. 15/966,246, filed Jan. 9, 2020 (8 pages).
"Response to Non Final Office Action," for U.S. Appl. No. 15/966,248, filed Jul. 14, 2020 (8 pages).

* cited by examiner

WALKER DEVICE FOR GAIT TRAINING

RELATED APPLICATIONS

This application is a continuation of Ser. No. 17/242,700, filed Apr. 28, 2021, which is a continuation of Ser. No. 15/966,248, filed Apr. 30, 2018, now issued as U.S. Pat. No. 11,000,440, which is a continuation of Ser. No. 15/074,231, filed Mar. 18, 2016, now issued as U.S. Pat. No. 9,956,131, which is a divisional of U.S. application Ser. No. 13/557,943, filed Jul. 25, 2012, now Abandoned, which is a continuation of U.S. application Ser. No. 12/948,320, filed Nov. 17, 2010, now issued as U.S. Pat. No. 8,251,079, which claims the benefit of U.S. Provisional Application No. 61/281,465, filed Nov. 18, 2009, the contents of each of which are herein incorporated by reference in their entirety.

TECHNICAL FIELD

The technology disclosed herein relates to a walker device designed to assist users with learning or returning to a natural walking gait. More particularly, the technology disclosed herein relates to a walker device designed to assist users with reciprocating motions during walking.

SUMMARY OF THE INVENTION

In one embodiment described herein, a walker device includes two side frames, each side frame including a front vertical support, a rear vertical support and at least one connecting member extending between the front and rear vertical supports. The walker device further includes a cross bar extending between the two side frames and pivotally connecting to the front vertical supports of the two side frames. The walker device also includes a tension device which applies a resistive force to the pivoting motion between the first cross bar and the two side frames. The walker device is therefore capable of a pivoting configuration which enables the user to learn or re-learn a more natural gait pattern including rotation of the upper and lower body.

In another embodiment, a walker device includes two side frames, each side frame including a front vertical support, a rear vertical support and at least one connecting member extending between the side frames. The walker device also includes a cross bar extending between the two side frames and pivotally connecting to the front vertical supports of the two side frames, as well as an auxiliary cross bar extending between and pivotally connecting to the two side frames, where the auxiliary cross bar is parallel to the cross bar. The walker device further includes a first tension device which applies a resistive force to the pivoting motion between the two side frames and one of the cross bar and auxiliary cross bar. The walker device also includes a second tension device which applies a resistive force to the pivoting motion between the two side frames and one of the cross bar and auxiliary cross bar.

In yet another embodiment, a walker device includes the two side frames and a cross bar extending between and pivotally connecting to the two side frames, the cross bar including a cylindrical sleeve at each end, wherein each cylindrical sleeve surrounds a portion of one of the two front vertical supports of the side frames. The walker device also includes an auxiliary cross bar extending between and pivotally connecting to the two side frames, wherein the auxiliary cross bar is parallel to the cross bar and is spaced back from the two front vertical supports. The walker device further includes first and second tension devices which apply a resistive force to the pivoting motion between the two side frames and one of the cross bar and auxiliary cross bar. The first and second tension devices are selected from the group consisting of a knob device including a knob, wherein the rotation of the knob applies a resistive force to the pivoting motion between the two side frames and one of the cross bar and the auxiliary cross bar, and a spring device including one or more springs attached to the cross bar and both of the two side frames, and a second knob device wherein the second knob device comprises a knob and squeezes the cylindrical sleeve against the front vertical support and comprises a second knob for increasing the resistive force.

The invention may be more completely understood and appreciated in consideration of the following detailed description of various embodiments of the invention in connection with the accompanying drawings.

DETAILED DESCRIPTION

Embodiments of a walker device are described herein having two side frames and at least a first cross bar, where the side frames are configured to pivot with respect to the cross bar. It is also possible to lock the two side frames into a position where they are at right angles to the cross bar. In the locked, right-angle configuration, the walker device can be used as a traditional walker device for support while walking.

With the use of traditional walkers, the user's upper body is kept fairly stationary and does not rotate with respect to the lower trunk. In unassisted, healthy walking patterns, the body undergoes several reciprocating, pivoting motions. As the weight of the body is transferred from one foot to the other foot during healthy walking, the hips rotate along the axis of the spine. The hips also rotate from side to side as one leg passes the other leg. To maintain balance in the body as the hips rotate along the axis of the spine, the shoulders rotate in the opposite direction along the axis of the spine.

When using a traditional walker device with static side frames, it is more difficult to perform these aspects of a typical reciprocating gait. The user may develop improper gait patterns. One example is the habit of shuffling the feet due to improper heel strike and toe push-off. These bad habits may continue even after the weight-bearing support of the walker device is not needed.

In the unlocked, pivoting configuration of the walker device described herein, the user can learn or re-learn a more natural gait pattern including rotation of the upper and lower body. A tension device provides resistance to the pivoting motion. Many different tension devices are possible, and more than one can be included in a particular walker device embodiment.

Certain embodiments of the walker device will have a second or auxiliary cross bar extending between and pivotally connected to the two side frames. It is also possible for embodiments of the walker device to have additional cross bars extending between and pivotally connected to the two side frames. The tension devices described herein generally may be located on any of the cross bars. If a tension device or other feature is described herein as being located on a particular cross bar, it should be understood that it could also be located on a different cross bar. The term cross bar assembly will be used to refer to the combination of the cross bars in a particular embodiment. Where the term cross bar is used, reference is made to any one or more than one of the cross bars in a particular embodiment.

Figure 1:
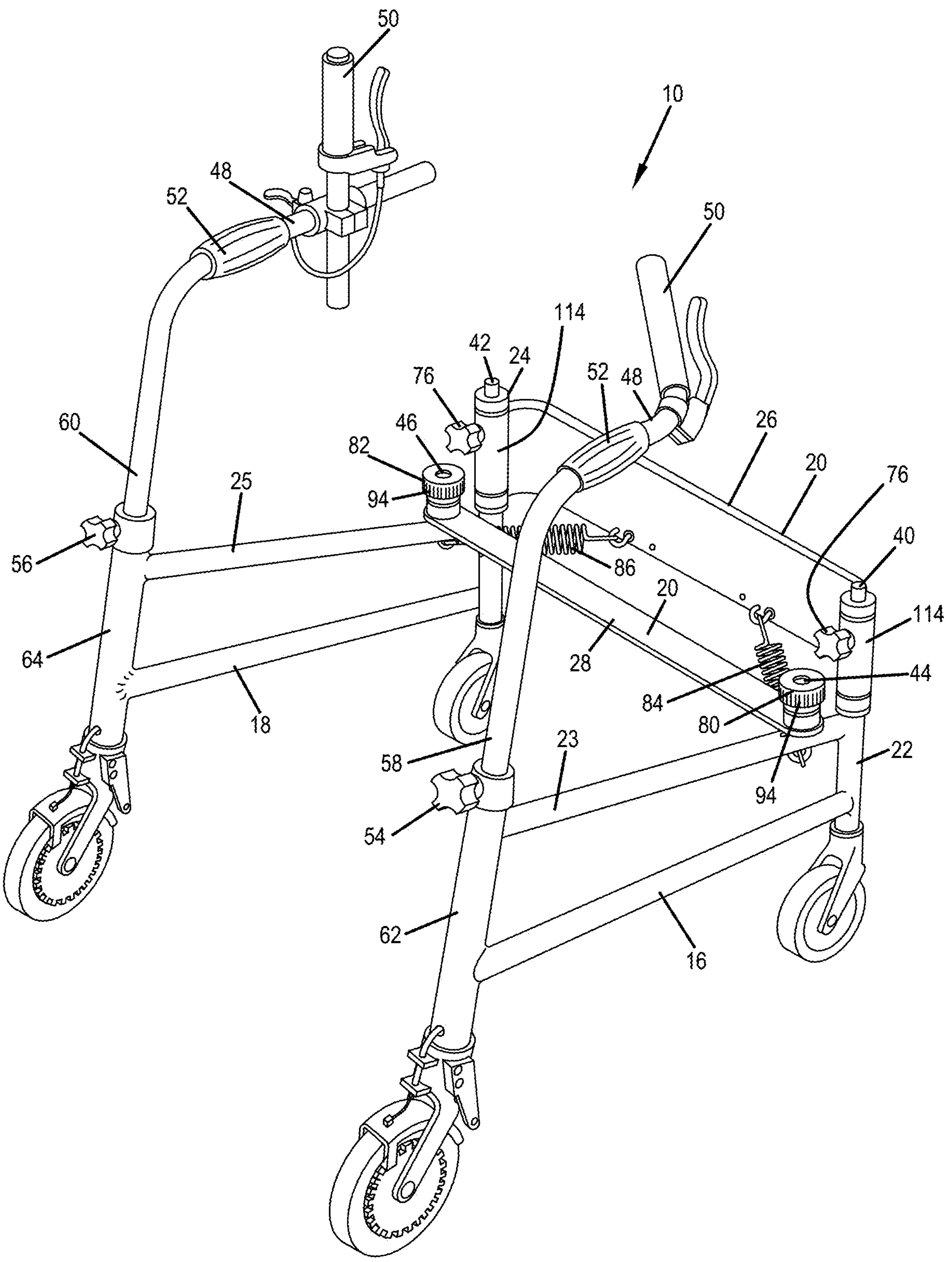
FIG. 1 is a rear, perspective view of one embodiment of a walker device for gait training.

FIG. 1 is a perspective view of a first walker device embodiment 10, including two side frames 16, 18. The walker device 10 has the capability of the side frames 16, 18 pivoting with respect to a cross bar assembly 20. Each side frame member 16, 18 includes a front vertical support 22, 24 and at least one horizontal member extending 23, 25 between a front vertical support and rear vertical supports. Although these elements are described as vertical and horizontal, they may also be substantially vertical, or substantially horizontal. The parts of the side frames, other members, supports and cross bars can be linear elements or they can instead be curved in some way. Similar parts in the different embodiments will be described using the same reference numbers and terminology.

The cross bar assembly is intended to be in front of the user while using the walker device, and the rest of the walker device is configured consistently with this arrangement. In some embodiments, the cross bar assembly includes only one cross bar member that extends between the two front vertical supports 22, 24. In some embodiments, the cross bar assembly includes a first cross bar 26 and an auxiliary cross bar 28. Generally where components are described herein as being positioned on the first cross bar, it is also possible for those components to be positioned on the auxiliary cross bar, and vice versa.

In some embodiments, a cross bar or one of the cross bars is located near the handgrips. Such a configuration can be helpful to provide a place for a caregiver to hold onto the walker device while guiding the user.

In some embodiments, portions of the first and auxiliary cross bars are offset from each other vertically, horizontally or both. In the embodiment of the FIGS, the two cross bars have a generally parallel orientation to each other. Also in the embodiment of the FIGS., the auxiliary cross bar is offset horizontally from the first cross bar, so that the auxiliary cross bar is located closer to the user location than the first cross bar and spaced apart from the vertical support members 22, 24. The horizontal offset and parallel orientation of the cross bars helps to hold the pivotable side frames in place and prevents the side frames from opening too wide or collapsing too narrowly towards the user during use.

In some embodiments, the auxiliary cross bar is offset vertically from the first crossbar, so that portions of the first cross bar are located above or farther from the wheels compared to the auxiliary cross bar. At the top of each side frame member 16, 18, there is a horizontal or substantially horizontal bar 48. The height of the top horizontal portions can be adjusted to be ideal for a particular user.

The walker device can also include vertical handgrips 50, which can be substantially vertically oriented. The handgrips can be positioned on handgrip extensions which serve to position the handgrips appropriately with respect to the user and are adjustable. The handgrip extensions may include portions that angle back and angle in towards the user. Horizontal handgrips 52 can also be provided on the horizontal or substantially horizontal member of each side frame.

The walker device 10 includes four wheels of approximately equal size. In one embodiment, the front wheels are larger casters with full ability to rotate, pivot and adjust to the position of the user for ambulation while the rear wheels do not pivot. In one embodiment, none of the wheels can pivot. In one embodiment, the back vertical supports have slide devices that provide drag for greater stability instead of wheels. In one embodiment, the rear wheels are pivotable. A brake feature can be provided on the rear wheels, which may be controlled on handle holds.

In various embodiments, the vertical front support, vertical rear support or both telescope and adjust for user height. In one embodiment, a range of adjustment is at least 6 inches. One option for accomplishing the vertical adjustment is by a push button mechanism located at the wheel and/or slide attachment. In the embodiment of FIG. 1, vertical adjustment knobs 54, 56 apply a force to inner vertical rear support members 58, 60 to adjust the degree to which they extend from outer vertical rear support members 62, 64.

In some embodiments, the parallel cross bar assembly 20 can adjust to accommodate for patient width size at least 6 inches, with slotted mechanics. In one embodiment, the width of the walker device is 24 inches, while the depth from the front vertical supports to the rear vertical supports is 22 inches. However, the walker device may be constructed in many different sizes.

In one embodiment, many of the structural components of the walker device are made of a metal, such as aluminum with an anodized finish. Many other materials are also possible, including stainless steel, composite materials and plastic materials.

Figure 2:
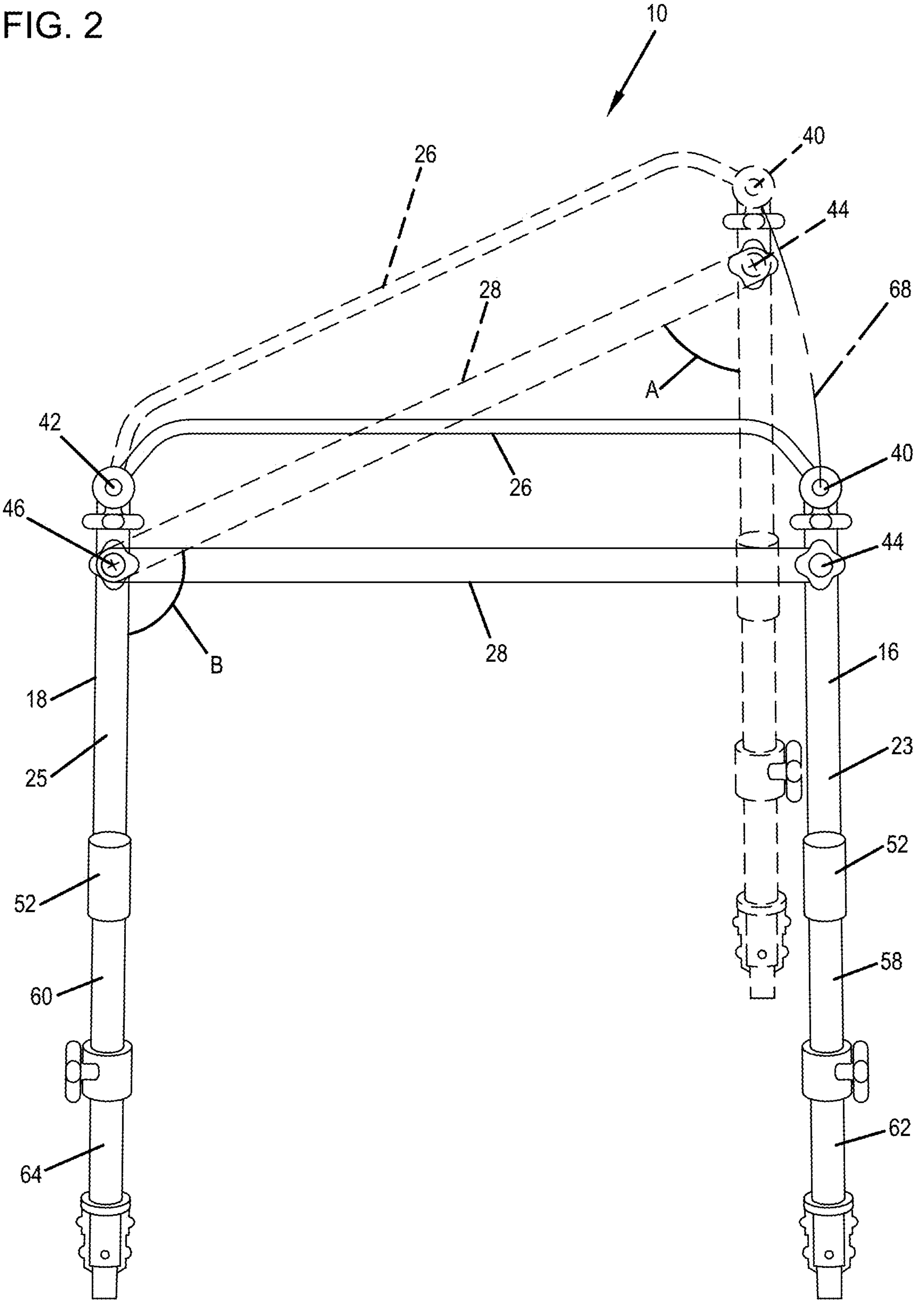
FIGS. 2-3 are top views of the walker device of FIG. 1 in different positions.
Figure 3:
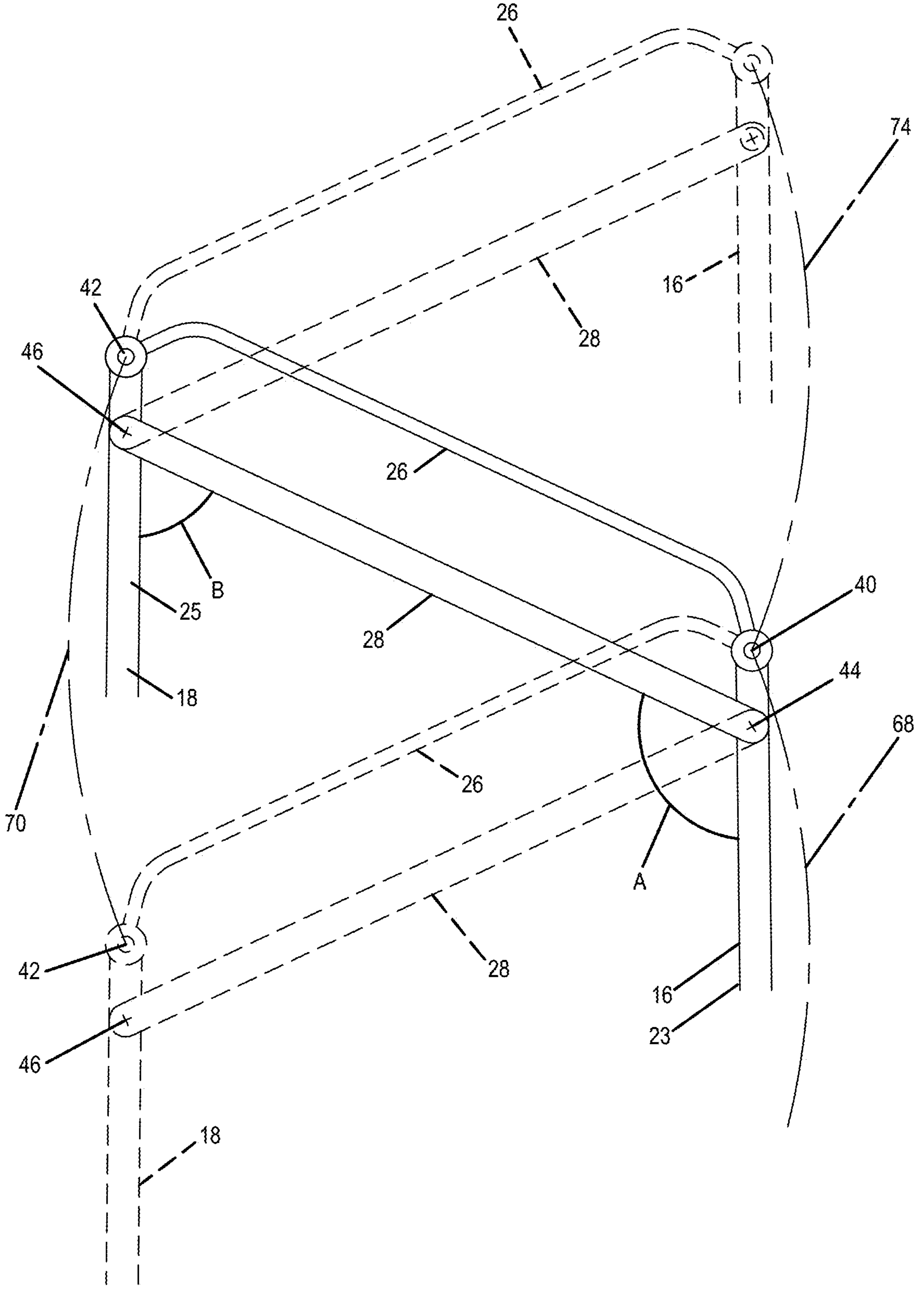

FIGS. 2 and 3 illustrate top views of a walker 10 including two side frames 16, 18, each side frame having a horizontal member 23, 25. The first cross bar 26 and parallel auxiliary cross bar 28 are also visible from this top view, as well as the inner and outer vertical support members 58, 60, 62 and 64. For simplicity and clarity, the vertical handgrips 52 are not shown in this view, and only the horizontal handgrips 50 are shown.

As can be seen in FIGS. 2 and 3, the first cross bar 26 has a pivot point 40 with the right side frame 16, and a pivot point 42 with the left side frame 18. The auxiliary cross bar 28 has a pivot point 44 with the right side frame 16, and a pivot point 46 with the left side frame 18.

The solid lines in FIG. 2 show the position of the walker when the side frame members 16, 18 are at generally right angles to the cross bars 26, 28. The walker 10 can be locked into this position and used as a traditional walker.

When the walker 10 is in an unlocked state, then the side frames can rotate with respect to the parallel cross bars, and the walker 10 can be used for gait training. The parallel configuration of the two crossbars helps to hold the side frames in place and prevents the side frames from opening and collapsing in on the user in the unlocked state. When the user pushes the right side frame 16 forward along path 68 during ambulation, the walker device takes the position shown in dashed lines the top view of FIG. 2. In this position, the right side frame 16 forms an angle A smaller than 90 degrees with cross bar 28, and the left side frame member 18 forms an angle B larger than 90 degrees with the cross bar 28.

FIG. 3 illustrates in solid lines the position of the walker 10 after the user pushes the left side frame 18 forward during walking, after starting from the dashed line position of FIG. 2, and after the pivot point 42 follows path 70. In the position shown in solid lines in FIG. 3, the right side frame 16 forms an angle A larger than 90 degrees with cross bar 28, and the left side frame member 18 forms an angle B smaller than 90 degrees with the cross bar 28. Then the user pushes the right side frame 16 forward, so that the pivot point 40 follows along path 74.

The user continues gait practice mindful of the feedback provided by the tension devices included in the walker to provide resistance for trunk rotation and reinforcement of those muscle groups necessary for normal bipedal locomotion. The walker device encourages rather than hinders trunk rotation, hip extension elongation of the posterior aspects of the trailing leg and upright postural stability during the entire gait cycle, all while providing support for the user's weight via the handgrips.

One or more tension devices are included to provide a resistive force to the pivoting motion between the cross bar and the side frames. The resistive force helps ensure that the side frame members stay fairly close to the user, and do not pivot away from the user. One or more of the tension devices are adjustable in various embodiments.

Locations where pivoting between two parts occurs and so tension devices can be provided are pivot points 40, 42 where the first cross bar 26 pivotally attaches to the side frames, as shown in the perspective view of FIG. 1. Other locations where tension devices can be provided are at the pivot points 44, 46 between the side frames and the auxiliary cross bar 28. In addition, tension can be provided between one or more points on one of the cross bars and one or more points on the side frames. Tension devices at these locations can be referred to as first tension devices, second tension devices, third tension devices, and so on. In one embodiment of the walker device, a first tension device is provided at two symmetric locations on the walker. In another embodiment, a first tension device is provided at two symmetric locations and a second tension device is provided at two different symmetric locations. In yet another embodiment, in addition to the first and second tension devices, a third tension device is provided at two additional symmetric locations on the walker. In other embodiments, four different tension devices are provided.

Sometimes it is desirable for both sides of the walker device to have the same tension placed on the rotation, while sometimes different tension on the two sides is desired.

Different structural options for tension devices will now be described. It will be understood that the different structures described and illustrated as tension devices could be provided at different locations on the walker.

The walker device 10 of FIG. 1 includes two lock/unlock devices 76 that are capable of securing the walker device into a first, locked configuration where the side panels are at 90 degree angles to the crossbar assembly, and is capable of allowing the walker device to be in a second, unlocked configuration where the side panels can be pivoted with respect to the cross bar assembly. The lock/unlock devices 76 are located on cylindrical sleeves 114 at the ends of the first cross bar 26. The cylindrical sleeves 114 surround the vertical support members 22, 24. Each lock/unlock device 76 includes a knob with a threaded shaft that fits into an opening in the cylindrical sleeve. The knob can be rotated so that the threaded shaft presses against the vertical support member 22, 24 and prevents it from rotating with respect to the cross bar 26.

Figure 4:
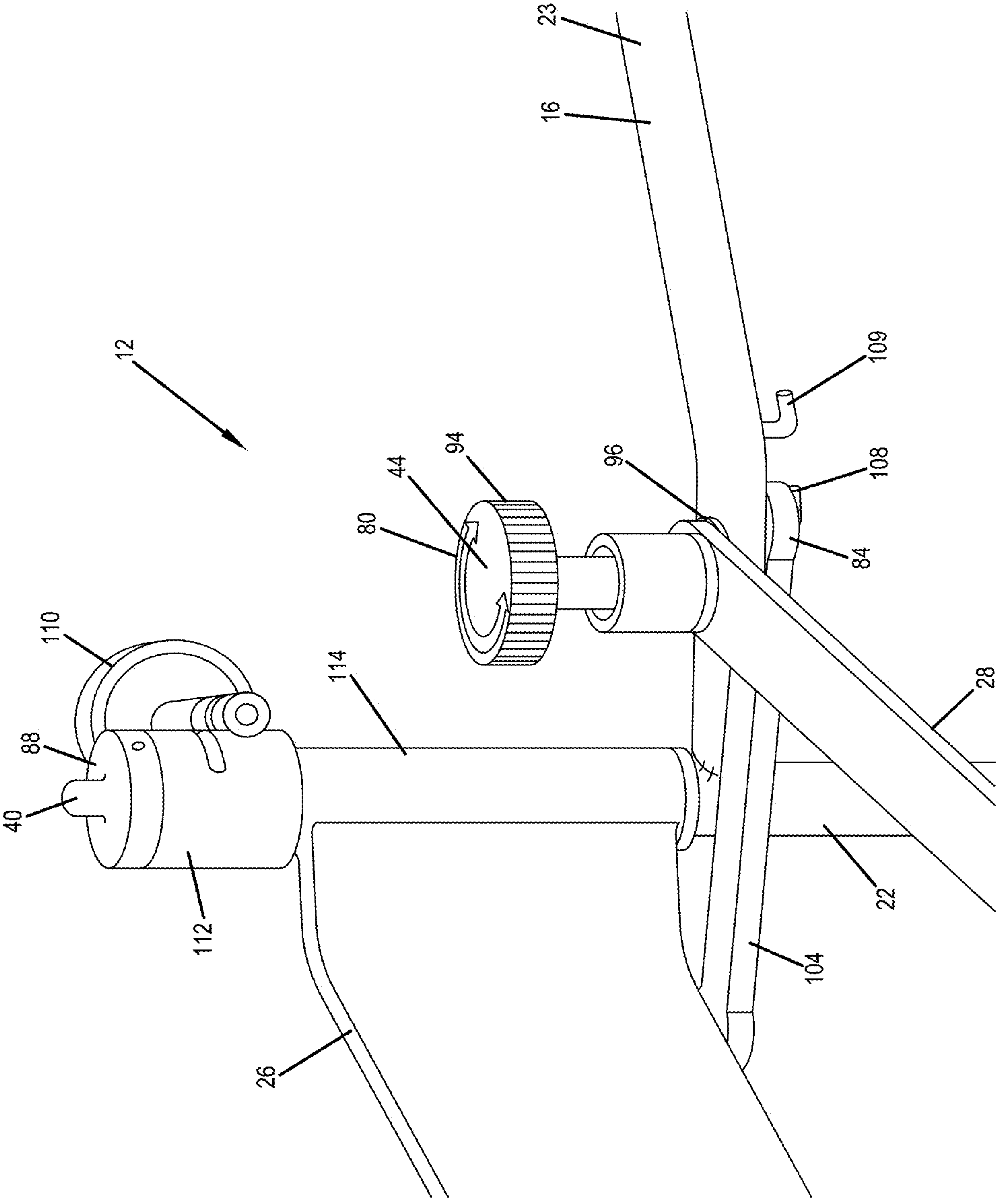
FIG. 4 is perspective view of one right side portion of the walker device of FIG. 1 including three tension devices.
Figure 5:
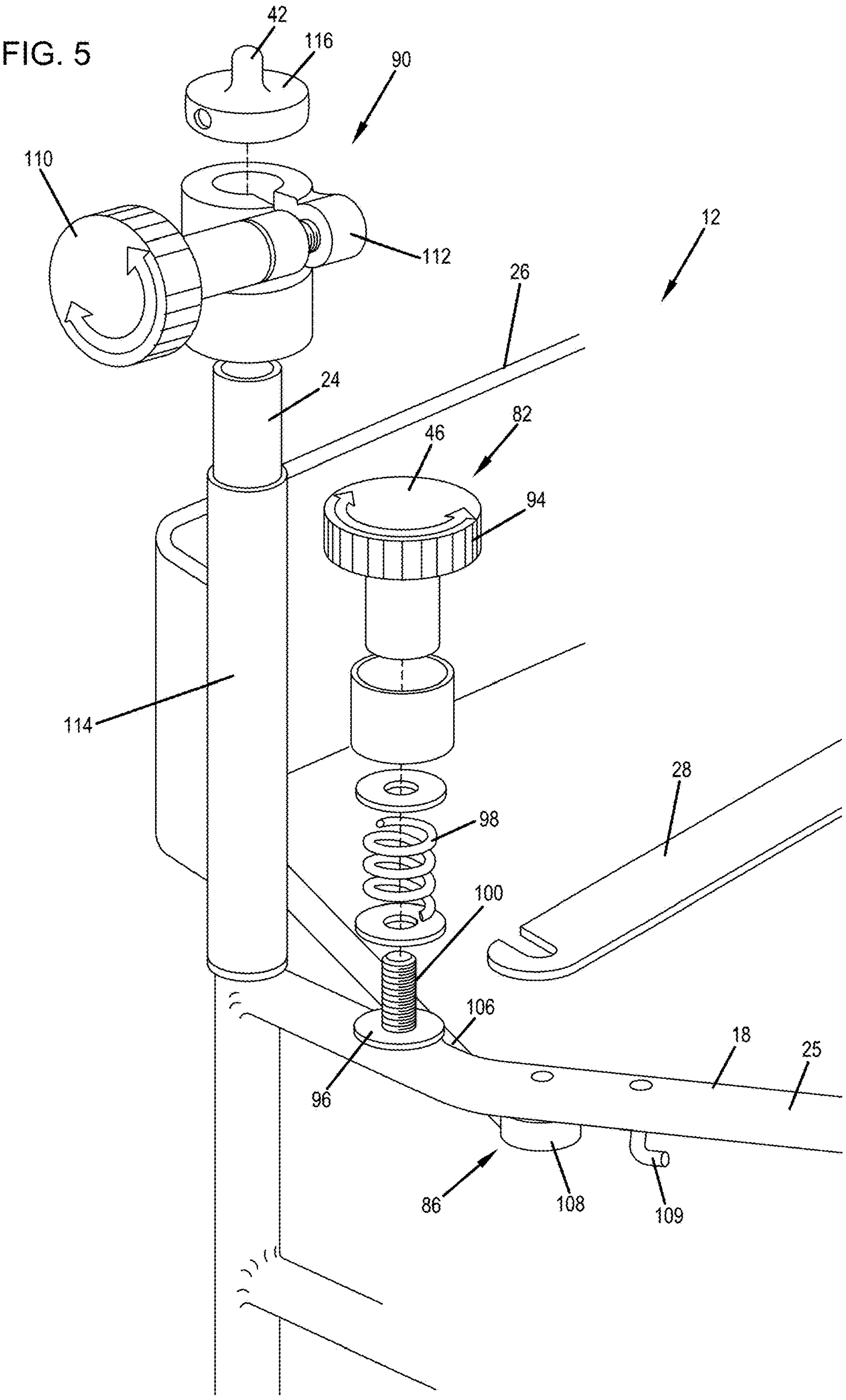
FIG. 5 is an exploded view of one left side portion of the walker device which includes three tension devices.

FIG. 4 is a perspective view of a right side of walker device 12, and it is understood that it is possible for the left side of the walker 12 to be a mirror image of the right side. FIG. 5 is a partially exploded view of the portion of the walker device 12 shown in FIG. 4, but on the left side. The walker device 12 of FIGS. 4 and 5 differs in a few respects from the walker device 10 of FIG. 1, although most structures are identical between the two walker devices. For example, the walker device 10 of FIG. 1 includes the lock/unlock devices 76, while the walker device 12 of FIGS. 4 and 5 does not. The walker device 12 of FIGS. 4 and 5 include tension devices 88 and 90 at pivot points 40,42, respectively, while the walker device 10 of FIG. 1 does not.

Three different tension devices are illustrated in FIGS. 4 and 5, namely, first tension devices 80, 82 at the pivot points 44, 46 of the auxiliary cross bar 28 (also shown in FIG. 1); second tension devices 84, 86 attached at the front cross bar 26 and the side frames 16, 18 (also shown in FIG. 1); and third tension devices 88, 90 at the pivot points 40, 42 of the first cross bar 26.

In one embodiment, the first tension devices 80, 82 are adjustable. One example of adjustable first tension devices 80, 82 are shown in FIGS. 4 and 5 and include a knob 94 that is rotated by hand to increase the resistance to pivoting at pivot point 46 between the side frame 18 and the auxiliary cross bar 28. The rotation of the knob 94 forces the end of the cross bar 28 against a first surface 96 of the side frame. More specifically, in this embodiment, the first surface 96 is a part of the left horizontal member 25. In some embodiments, the first tension device 82 further includes a pliable member 98, such a spring, a gasket, a bushing, felt pad, a rubber gasket, a rubber bushing or a pliable mat. In some embodiments, the first tension device includes a threaded screw shaft 100 where the knob has a cooperating thread that can be used to pull the knob toward the first surface 96. In some embodiments, the first tension device 82 further includes one or more bushings, washers and sleeves in order to provide the smoothest possible operation and adjustability.

The term knob as used herein refers to any structure that can be rotated to adjust a resistive force. In the figures, a circular knob with gripping structures on its outer diameter is illustrated for some embodiments but other structures can be used. Other structures that can be rotated to adjust a resistive force are a wing nut, a lever, a bar, a quick-release lever and the like.

In various embodiments, a second tension device is provided on each side of the device, such as spring mechanisms 84, 86, as shown best in FIG. 1 where the spring mechanisms 84, 86 include coil springs. In the walker device 12 of FIGS. 4 and 5, spring mechanisms 84, 86 are also present, but tension bands 104, 106 are used instead of coil springs as the spring element. Many other arrangements for a spring-type tension device are also possible. Instead of the spiral spring shown in FIG. 1 or the tension band shown in FIGS. 4 and 5, a different type of spring mechanism could be provided such as a stretchable band, a fluid cylinder, or a bungee cord.

Now referring to FIG. 4, the second tension device 84 is a spring or spring-like element 104 with one end attached to the first or auxiliary cross bar. In the illustrated embodiment, the spring 104 is attached to the first cross bar 26 at a bottom surface. The opposite end of the spring element 104 is attached to the side frame 16 at one of two locations 108, 109, so that the tension can be adjusted by which of the two locations is selected. The springs provide resistance to the pivoting motion of the side frames 16, 18 with respect to the first cross bar 26. Due to the nature of a spring mechanism, this type of a second tension device will cause resistance that depends on the direction of the pivoting motion.

In another embodiment that is not illustrated, a first spring and a second spring both extend across a front face of the auxiliary cross bar or first cross bar, where one spring is on the user's right side while the second spring is on the user's left side. In this embodiment, each spring is attached at a central attachment point on one of the cross bars, such as an eyebolt extension. Each spring also is attached at a portion of one of the side frames.

In some embodiments, the spring elements 104, 106 or the entire tension devices 84, 86 are located inside of a housing. Such a housing can be constructed of injection-molded plastic, metal or many other materials, and can extend across the front of the walker device. Alternatively, two housings can be provided to enclose each spring element.

Referring to FIGS. 4 and 5, third tension devices 88, 90 provide a resistive force at pivot points 40, 42 to the pivoting of the side frames with respect to the front cross bar 26. FIG. 5 shows a partially exploded view of the left side third tension device 90, which includes a knob 110 and a radial force device 112 whose inner diameter will be reduced or increased as the knob 110 is rotated. The first cross bar 26 includes cylindrical sleeves 114 at its ends that fit around the vertical support members. The radial force device 112 fits over the top of the vertical support 24, and also over a portion of the cylindrical sleeve 114 of the cross bar 26. By applying radial force to the outside of the cylindrical sleeve, the third tension device squeezes the cylindrical sleeve against vertical support, thereby increasing the resistive force to the pivoting motion. In one embodiment, tightening the third tension devices 88, 90 is one way to place the walker into a locked position with the side frame members at 90 degree angles to the cross bar assembly. Other tension structures described herein can also be used to lock the side frames in a particular position with respect to the cross bar.

Another option for a tension device is a spring located inside of each cylindrical sleeve 114 to provide a resistive force to the pivoting motion. Each such a spring can be attached to the interior surface of the cylindrical sleeve 114 and also to the vertical support member 22 or 24.

Another option for a tension device that is not illustrated in the FIGS. is a wing nut or other tightening device acting on the front vertical support members. In one such embodiment, each of the front vertical support members includes an outer support and an inner support that fits inside the outer support and extends out of the top of the outer support. A clamping device is provided to fix the position of the inner support with respect to the outer support. Examples of such clamping devices include wing nuts, where one wing nut is positioned on each of the front vertical supports. Many other types of clamping or stopping devices are possible also. It is also possible to include a second pair of wing nuts in the device. In one embodiment, a first wing nut passes through both the outer and inner support members, while a second wing nut passes through the outer support member and applies pressure to the inner support member.

Yet another option for a tension device is a friction plate device. In one embodiment, a friction plate device includes a first plate that extends from an outer portion of each of the front vertical supports. Pliable members serve as friction plates and are sandwiched between the first plate and one of the crossbars. Two pliable members can be used, but it is also possible to include only one pliable member, three pliable members, or other numbers of pliable members. A disk of felt is one option for a pliable member.

A friction plate clamping device is also provided to urge the first plate toward the cross bar. In one embodiment, a screw is provided, along with a large wing nut handle for turning by hand. A bolt is present on the opposite end of the screw. In addition, there are many other possibilities for a tension device that can be used in a friction plate device.

In one walker device embodiment, a gait measurement device is provided to record the degree to which the user causes pivoting of the cross bar with respect to the side frames during use of the walker. One embodiment also provides for limitation of the degree of pivoting allowed, including the ability to lock the side frame members into a 90 degree orientation with the cross bar assembly. Such an embodiment is illustrated in U.S. Provisional Application No. 61/281,465, filed Nov. 18, 2009, the content of which was previously incorporated by reference in its entirety.

One embodiment for gait measurement includes both a first cross bar and an auxiliary cross bar as a part of the cross bar assembly. The auxiliary cross bar is offset horizontally compared to the first cross bar. In other words, the first cross bar is in a first position relative to a plane defined by the two front vertical supports, and the auxiliary cross bar is in a second, different position relative to that plane. In one embodiment of a gait measurement and limiting device, a top extension extends at a right angle from the center of the first cross bar towards the auxiliary cross bar. The top extension includes a horizontal portion which extends over the top horizontal plate of the auxiliary cross bar. The top extension also includes a vertical portion, which extends in front of the vertical plate of the auxiliary cross bar.

On the auxiliary cross bar, a measurement scale can be provided in some embodiments. By observing the position of the extension with respect to the measurement scale, the degree of rotation of the side panel members with respect to the front cross bar can be determined. Larger degrees of rotation lead to the extension being positioned closer to the ends of the measurement scale. It is possible for the measurement scale to be labeled with quantitative indications of the degree of reciprocating motion.

In order to record the degree of rotation, a measurement bar is provided which is attached to the auxiliary cross bar. The measurement bar supports two sliders, which are slidably mounted on the measurement bar. During reciprocating motion of the walker device, the extension pushes the sliders along the measurement bar. By looking at the position of the sliders on the measurement bar, the degree of reciprocating motion of the user on each side of the body during ambulation can be observed.

The walker device can be locked into a static position and prevented from reciprocating movement. The top extension can define a first centered opening that can be aligned with a second centered opening on the auxiliary cross bar. If a peg is placed through the first and second locking holes, the walker is locked into a static position, such that the side frames are at substantially right angles to the cross bar assembly.

In addition to the first and second centered openings, additional openings can be provided on the top horizontal plate of the auxiliary cross bar. These other openings are offset from the center at regular intervals. Moveable pegs within these openings and interact with a second, lower extension from the first cross bar. As the side frame members rotate with respect to the first cross bar, the position of the top and lower extensions vary with respect to the center of the auxiliary cross bar. The lower extension contacts the pegs and as a result, cannot move any farther away from the center of the auxiliary cross bar.

A walker device as described herein can be used in many different ways. Various embodiments of method of use and adjustment of the walker device will now be described. The user stands facing the front cross bars while holding the hand grips located directly on the horizontal bars or on the upright handles, wherever the user feels most comfortable in order to best maintain postural stability and joint integrity. The top horizontal or substantially horizontal members of the side frames will alternatively be referred to as the handgrip bars herein. If the pivoting motion is prevented by the gait limiting device, the handgrip bars will be static with respect to the front cross bar, and the user may then ambulate forward with handgrip bars static. As the user becomes more advanced and is able to use a reciprocal patterning in ambulation, involving rotation of the upper and lower body, the one or more tension devices that are capable of locking are unlocked to permit rotation of the side frame members with respect to the front cross bar.

In the embodiment illustrated in FIGS. 4 and 5, locking the mechanism for static, non-pivoting action is accomplished by tightening the third tension device 88, 90. In the embodiment illustrated in FIG. 1, lock/unlock devices 76 are used to lock the walker device in a position that does not allow for pivoting.

The user is attentive to initiating heel strike with the left leg forward, while the right arm and shoulder simultaneously move forward via slight trunk and pelvic rotation. The user continues through the gait cycle by balancing on the left foot during stance phase while holding handgrip bars for stability. The push off through the left ball of foot and great toe are simultaneously performed as the trunk rotates in the opposite direction (left arm and shoulder moving forward) as the right heel strikes and progresses through stance phase and toe push off on that side.

The user continues gait practice mindful of the feedback provided by the spring-loaded tension device located on the front cross bar placed to provide resistance for trunk rotation and reinforcement of those muscle groups necessary for normal bipedal locomotion. The walker device encourages rather than hinders trunk rotation, hip extension elongation of the posterior aspects of the trailing leg and upright postural stability during the entire gait cycle.

The pivot resistance mechanisms are locked in place for the early stages of functional trunk rotation and hip extension ability. Unlocking the devices engages the twisting and pivot resistance components, which can be adjusted to a determined level of resistance by turning the knobs on the adjustable tension devices. This controlled resistance to the patient's reciprocating movements of the patients imparted by the walker device provides the user with greater proprioceptive and kinetic feedback, which will enhance volitional control and strength of the desired muscle groups.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as "arranged", "arranged and configured", "constructed and arranged", "constructed", "manufactured and arranged", and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

This application is intended to cover adaptations or variations of the present subject matter. It is to be understood that the above description is intended to be illustrative, and not restrictive.

The invention claimed is:

1. A gait training device comprising, two side frames comprising a left side frame and a right side frame, each side frame comprising a front vertical support, a rear vertical support and at least one connecting member extending between the front and rear vertical supports;

a cross bar extending between the two side frames and pivotally connected to the two side frames;

a first handgrip in contact with the left side frame and substantially vertical to the ground;

a second handgrip in contact with the right side frame and positioned substantially vertical to the ground; and a tension device, wherein the tension device applies a resistive force during a pivoting motion between a left side frame and at least one other component and between a right side frame and at least one other component;

wherein the first handgrip and second handgrip each have a free end.

2. The device of claim 1, further comprising one or more lock and unlock devices configured to lock the two side frames into a static position.

3. The device of claim 2, wherein the one or more lock and unlock devices are further configured to switch the gait training device from a locked configuration to an unlocked configuration and from an unlocked configuration to a locked configuration.

4. The device of claim 1, wherein the gait training device comprises two lock and unlock devices, wherein the two lock and unlock devices are positioned on opposite sides of the cross bar.

5. The device of claim 1, wherein the tension device applies a resistive force during a pivoting motion between the cross bar and the two side frames.

6. The device of claim 5, wherein the tension device comprises one or more springs, wherein the one or more springs are selected from the group consisting of a spiral spring, a fluid cylinder, a stretchable band, a coil spring and a bungee cord.

7. The device of claim 5, wherein the tension device comprises one or more springs, wherein the one or more springs comprise:

a first spring attached to the cross bar and one of the two side frames; and a second spring attached to the cross bar and the other of the two side frames.

8. The device of claim 1, wherein the gait training device further comprises an auxiliary cross bar extending between and pivotally connected to each of the two side frames, wherein the auxiliary cross bar is parallel to the cross bar.

9. The device of claim 8, wherein the gait training device comprises one lock and unlock device positioned along the auxiliary cross bar.

10. The device of claim 1, wherein the first handgrip and the second handgrip are each positioned on handgrip extensions, the handgrip extensions configured to angle back and angle towards a user.

11. The device of claim 1, further comprising:

a third handgrip in contact with the left side frame and positioned substantially horizonal to the ground; and a fourth handgrip in contact with the right side frame and positioned substantially horizonal to the ground.

12. A gait training device comprising, two side frames comprising a left side frame and a right side frame, each side frame comprising a front vertical support, a rear vertical support and at least one connecting member extending between the front and rear vertical supports;

a cross bar extending between the two side frames and pivotally connected to the two side frames;

at least one wheel in contact with the left side frame and configured to be in contact with the ground when a user walks with the gait training device;

at least one wheel in contact with the right side frame and configured to be in contact with the ground when the user walks with the gait training device;

a first handgrip in contact with the left side frame and positioned substantially vertical to the ground;

a second handgrip in contact with the right side frame and positioned substantially vertical to the ground; and a tension device, wherein the tension device applies a resistive force during a pivoting motion between a left side frame and at least one other component and between a right side frame and at least one other component.

13. The device of claim 12, further comprising one or more lock and unlock devices configured to lock the two side frames into a static position.

14. The device of claim 12, wherein the one or more lock and unlock devices are further configured to switch the gait training device from a locked configuration to an unlocked configuration and from an unlocked configuration to a locked configuration.

15. The device of claim 14, wherein, in the locked configuration the two side frames are locked in a substantially 90-degree angle to the cross bar; and in the unlocked configuration the side frames are able to pivot with respect to the cross bar.

16. The device of claim 12, wherein the tension device applies a resistive force during a pivoting motion between the cross bar and the two side frames while allowing the pivoting motion between the cross bar and the two side frames during use of the gait training device.

17. A method of improving the natural gait pattern of a person, comprising:

using a gait training device comprising substantially vertical handgrips, at least one wheel in contact with a left side frame, at least one wheel in contact with a right side frame, a cross bar pivotally connecting the left side frame to the right side frame, at least one lock and unlock device;

securing the lock and unlock device in a locked configuration, wherein the left side frame and the right side frame are locked in a static position to the cross bar, thereby allowing the person to use the gait training device as a walker device; and securing the lock and unlock device in an unlocked configuration, wherein the left side frame and the right side frame are able to pivot with respect to the cross bar, wherein the left side frame can move in the direction counter to the right side frame while the at least one wheel of the left side frame and the at least one wheel of the right side frame make contact with the ground, wherein a tension device applies a resistive force during a pivoting motion between the cross bar and the two side frames.

18. The method of claim 17, wherein the method further comprises, walking in a series of steps, while the lock and unlock device is in the unlocked configuration, wherein hands reside on the handgrips, each step comprising a reciprocating pivoting motion by transferring the weight from one foot to the other, the series of said steps comprising the person's left leg moving in motion counter to that of the person's left arm and the person's right leg, the person's right leg moving a motion counter to that of the right arm and the left leg, the person's pelvis rotating, the left side frame moving in the direction counter to the right side frame while the at least one wheel of the left side frame and the at least one wheel of the right side frame make contact with the ground, and a tensioning device adding resistance to the reciprocating pivoting motion of the left side frame and the right side frame.

19. The method of claim 17, wherein in the locked configuration the left side frame and the right side frame are locked in a substantially 90-degree angle to the cross bar; and in the unlocked configuration the left side frame and the right side frame are able to pivot with respect to the cross bar.

20. The method of claim 17, wherein the gait training device further comprises an auxiliary cross bar extending between and pivotally connected to each of the two side frames, wherein the auxiliary cross bar is parallel to the cross bar.

* * * * *